(12) United States Patent
Matsushima et al.

(10) Patent No.: US 7,748,484 B2
(45) Date of Patent: Jul. 6, 2010

(54) PIPING FIXING STRUCTURE

(75) Inventors: Shintaro Matsushima, Ebina (JP); Hiroshi Ishiguro, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 420 days.

(21) Appl. No.: 11/735,692

(22) Filed: Apr. 16, 2007

(65) Prior Publication Data

US 2007/0240923 A1    Oct. 18, 2007

(30) Foreign Application Priority Data

Apr. 17, 2006 (JP) ............................ 2006-113110

(51) Int. Cl.
*B60K 11/04* (2006.01)
(52) U.S. Cl. ..................... 180/68.4; 180/68.6; 180/69.4
(58) Field of Classification Search ............... 180/68.4, 180/68.6, 69.4; 248/56, 58, 62, 65, 68.1
See application file for complete search history.

(56) References Cited

U.S. PATENT DOCUMENTS 3,762,671 A * 10/1973 Schulz ................... 267/140.2
4,538,697 A * 9/1985 Muroi et al. ............... 180/68.4
4,662,432 A * 5/1987 Suzuki ........................ 165/41
4,720,075 A * 1/1988 Peterson et al. ............. 248/635
4,821,828 A * 4/1989 Schwerzler et al. ........ 180/68.4
5,127,489 A * 7/1992 Takato et al. ................ 180/309
5,873,429 A * 2/1999 Qutub ........................ 180/309
7,032,701 B2 * 4/2006 Yoshida et al. ............. 180/291

FOREIGN PATENT DOCUMENTS

| CN | 1102687 A | 5/1995 |
|---|---|---|
| CN | 1490187 A | 4/2004 |
| JP | 61-6020 A | 1/1986 |
| JP | 7-127448 A | 5/1995 |
| JP | 10-329701 A | 12/1998 |
| JP | 11-165543 A | 6/1999 |
| KR | 1998-037451 A | 8/1998 |
| KR | 1999-0033519 U | 8/1999 |

* cited by examiner

*Primary Examiner*—Jeffrey J Restifo
*Assistant Examiner*—Bryan A Evans
(74) *Attorney, Agent, or Firm*—Foley & Lardner LLP (57) ABSTRACT

A piping fixing structure of the present invention includes: a vehicle body; a suspension member which is elastically supported by the vehicle body via a vibration damping member, and supports a suspension; and a fixing mechanism which fixes piping to the suspension member. The piping extends from a driving source which is elastically supported by the vehicle body via the vibration damping member.

5 Claims, 6 Drawing Sheets

PIPING FIXING STRUCTURE

BACKGROUND OF THE INVENTION

1. Field of the Invention

The present invention relates to a fixing structure for piping which is extended from a driving source.

2. Description of the Related Art

A radiator hose is provided between an engine and a radiator in order to circulate cooling water.

A lower radiator hose may vibrate due to vibration or pulsation (hereinafter, referred to as vibration or the like) of an engine. When the lower radiator hose has large vibration, the hose interferes with peripheral parts. Conventionally, providing a certain amount of space around a radiator hose has been a common way to avoid this problem.

However, providing a space around a radiator hose is not preferable in terms of an effective use of space. In order to solve this problem, a method is proposed for fixing a radiator hose to a radiator core support (a vehicle body) to prevent the radiator hose from vibrating and interfering with peripheral parts (see Japanese Patent Unexamined Publication No. S61-6020).

However, when a radiator hose is fixed to a radiator core support as above, vibration or the like of an engine travels to the vehicle body through the radiator hose and the radiator core support, thus causing vibration of the overall vehicle body. Therefore, ride comfort could be deteriorated.

Hence, a method is proposed for fixing a radiator hose to a radiator core support via an elastic body so that the elastic body absorbs vibration of the radiator hose (see Japanese Patent Unexamined Publication No. H10-329701).

BRIEF SUMMARY OF THE INVENTION

However, in the technology proposed in the Japanese Patent Unexamined Publication No. H10-329701, there is a problem in that an elastic body is required as an additional part when fixing a radiator hose to a radiator core support, which causes an increase in manufacturing cost.

An object of the present invention is provide a piping fixing structure which prevents vibration or the like of a driving source from traveling to a vehicle body without providing an additional part.

According to one aspect of the present invention, there is provided a piping fixing structure comprising: a vehicle body; a suspension member which is elastically supported by the vehicle body via a vibration damping member, and supports a suspension; and a fixing mechanism which fixes piping to the suspension member, the piping extending from a driving source which is elastically supported by the vehicle body via the vibration damping member.

BRIEF DESCRIPTION OF THE SEVERAL VIEWS OF THE DRAWING

The invention will now be described with reference to the accompanying drawings wherein.

DETAILED DESCRIPTION OF THE INVENTION

Hereinafter, description will be made of embodiments of the present invention with reference to the drawings.

Figure 1:
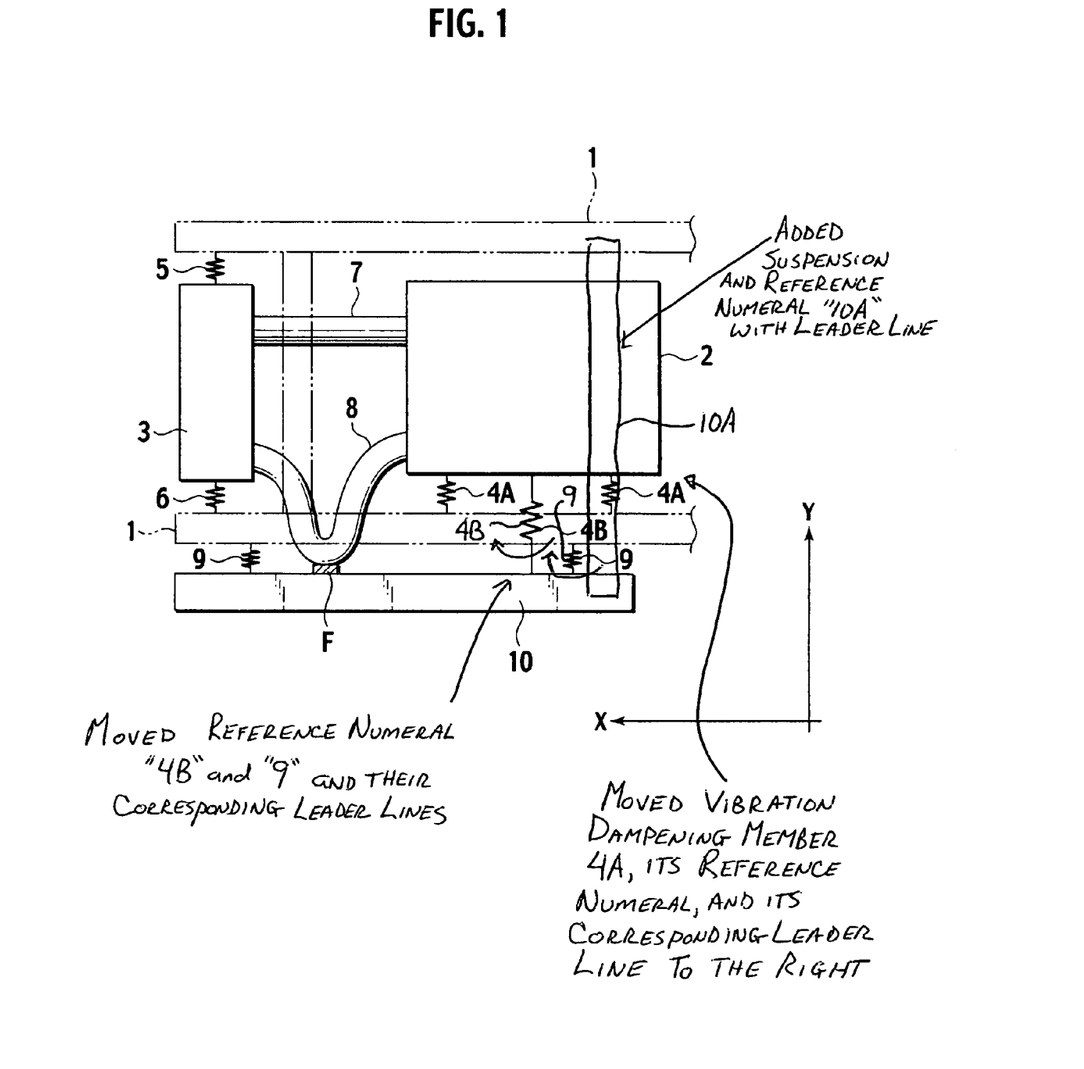
FIG. 1 is a schematic view showing the construction of a front portion of a vehicle body to which a piping fixing structure according to an embodiment of the present invention is applied.

FIG. 1 is a view showing a structure of a front portion of a vehicle body to which a piping fixing structure according to an embodiment of the present invention is applied. As shown in FIG. 1, an engine (a driving source) 2 is mounted on a front portion of a vehicle body 1, and a radiator (functional part) 3 is arranged in front of the engine 2. A suspension member 10 is attached to the vehicle body 1 via a vibration damping member 9. The lower portion of the engine 2 is supported by the vehicle body 1 via a vibration damping member 4A, and is supported by the suspension member 10 via a vibration damping member 4B. The upper and lower portions of the radiator 3 are supported by the vehicle body 1 via vibration damping members 5 and 6. The suspension member 10 supports a suspension 10A. As the vibration damping member, an elastic member, for example, a leaf spring, a coil spring, a volute spring, a rubber spring, an air spring and the like can be used.

Also, one end of an upper radiator hose 7 is connected to the upper portion of the radiator 3, and one end of a lower radiator hose 8 is connected to the lower portion of the radiator 3. Further, the other ends of the upper radiator hose 7 and lower radiator hose 8 are connected to the engine 2, respectively.

Note that, in Figures, X represents a direction towards the front side of the vehicle body, and Y represents a direction towards the upper side of the vehicle body.

Also, in this embodiment, an intermediate portion of the lower radiator hose 8 is fixed to the suspension member 10.

Figure 2:
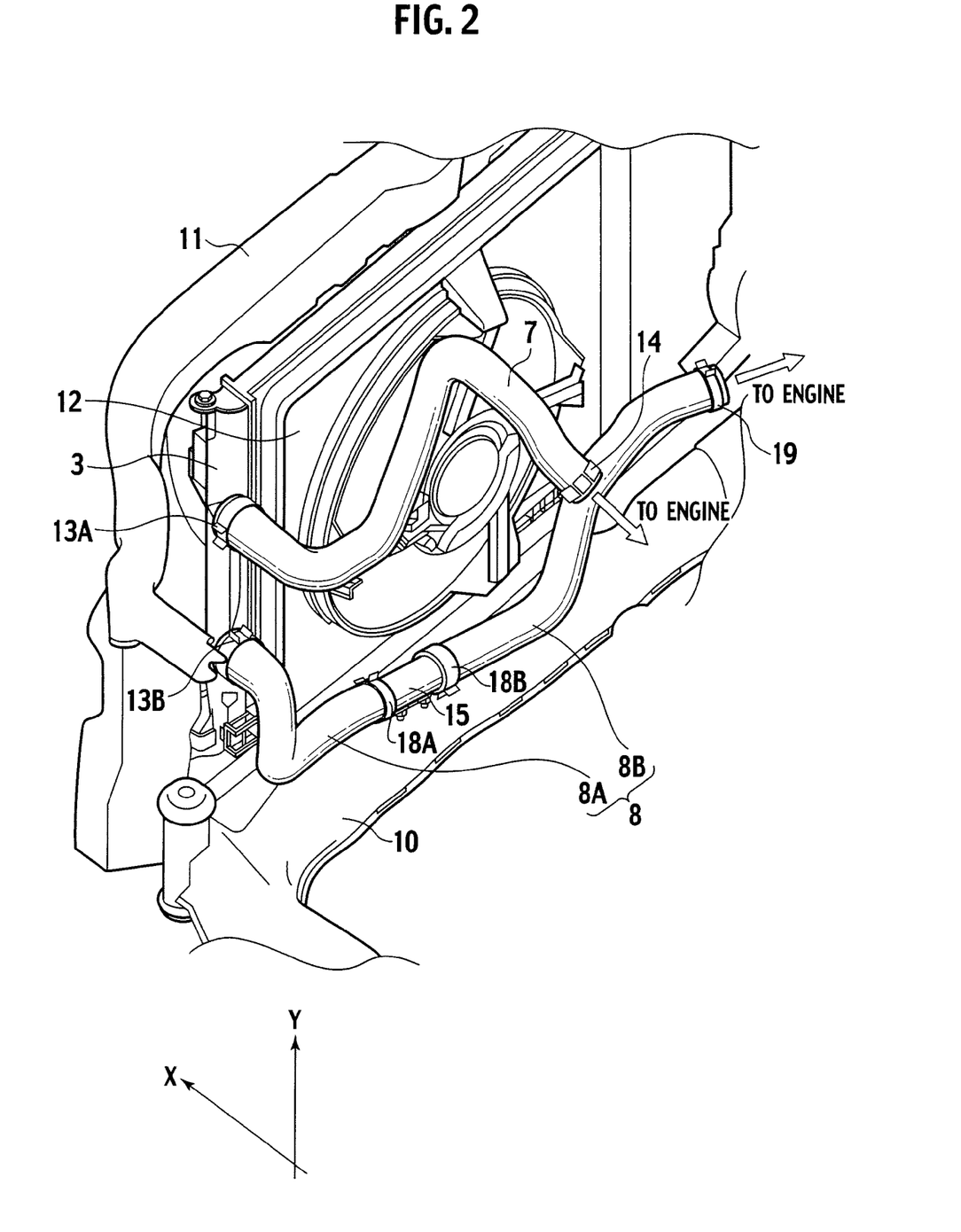
FIG. 2 is a perspective view showing a back side of a radiator.

FIG. 2 is a perspective view of the back side of the radiator 3. As shown in FIG. 2, the radiator 3 is fixed to a radiator core support 11, and further, a motor fan shroud 12 is attached to the back side of the radiator 3.

Furthermore, one end of the upper radiator hose 7 is connected to the radiator 3 by an alpha clamp 13A, and the other end thereof is connected to the engine 2 (see FIG. 1) by an alpha clamp 14. The lower radiator hose 8 is separated in the middle into two hoses, i.e. a lower radiator hose 8A on the radiator side and a lower radiator hose 8B on the engine side, so that the engine 2 and the radiator 3 can be attached to the vehicle body 1 separately. After the engine 2 and the radiator 3 are attached to the vehicle body 1, the separated two lower radiator hoses 8A and 8B are connected to each other via an intermediate pipe (connecting member) 15. One end of the lower radiator hose 8A is connected to the radiator 3 by an alpha clamp 13B, and the other end thereof is connected to the intermediate pipe 15 by an alpha clamp 18A. Also, one end of the lower radiator hose 8B is connected to the intermediate pipe 15 by an alpha clamp 18B, and the other end thereof is connected to the engine 2 by an alpha clamp 19. The intermediate pipe 15 is fixed to the suspension member 10 via a fixing mechanism F.

Figure 3:
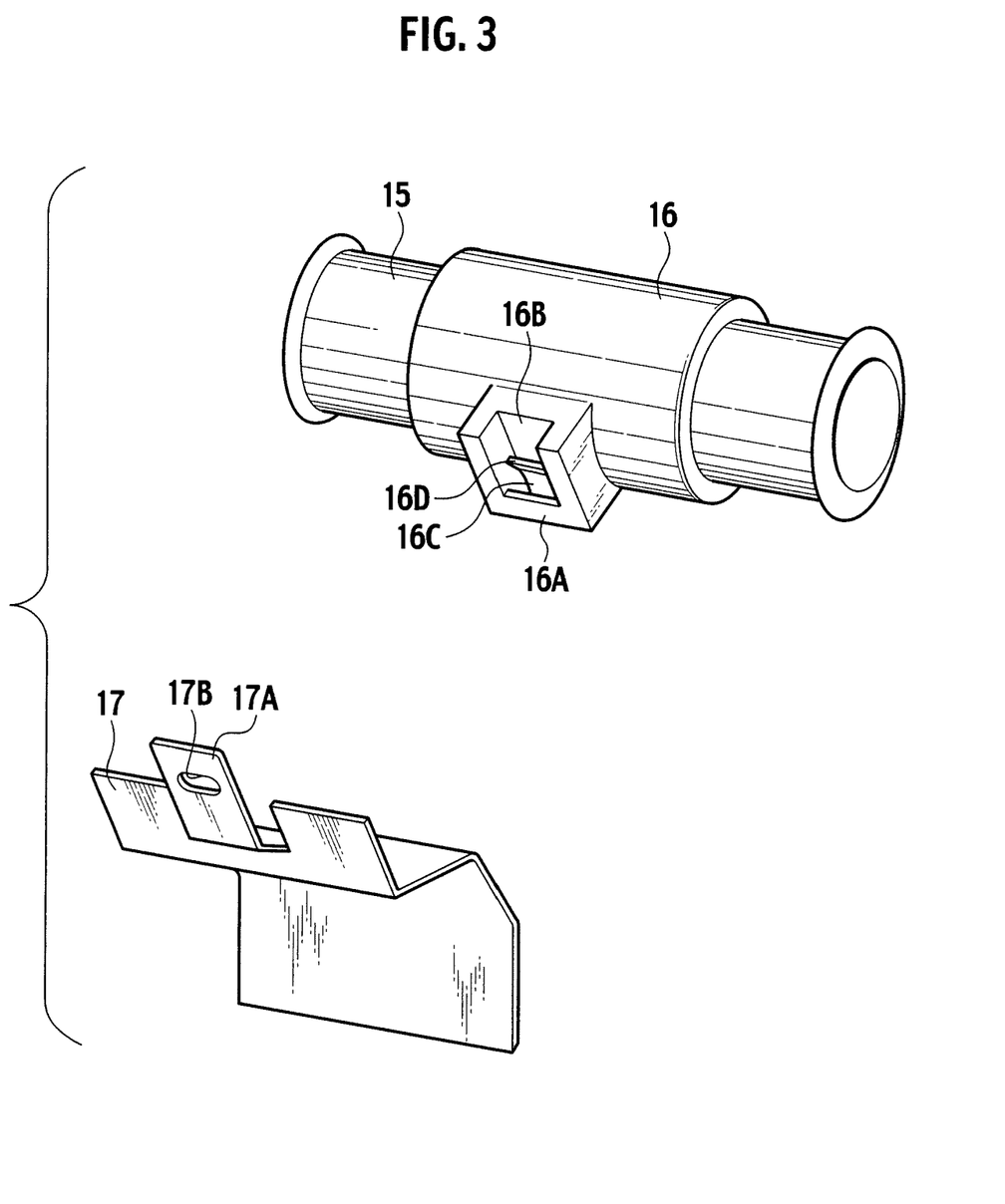
FIG. 3 is a perspective view showing an example of a fixing mechanism that is used for fixing an intermediate pipe to a suspension member.

FIG. 3 depicts an example of the fixing mechanism F for fixing the intermediate pipe 15 to the suspension member 10. In this embodiment, the fixing mechanism F includes a cylindrical fixing member 16 which covers the outer circumference surface of the intermediate pipe 15 and has a connecting portion 16A on the outer circumference surface of itself. Further, the fixing mechanism F includes a bracket 17 which is attached to the suspension member 10 and can be connected to the connecting portion 16A.

Figure 4:
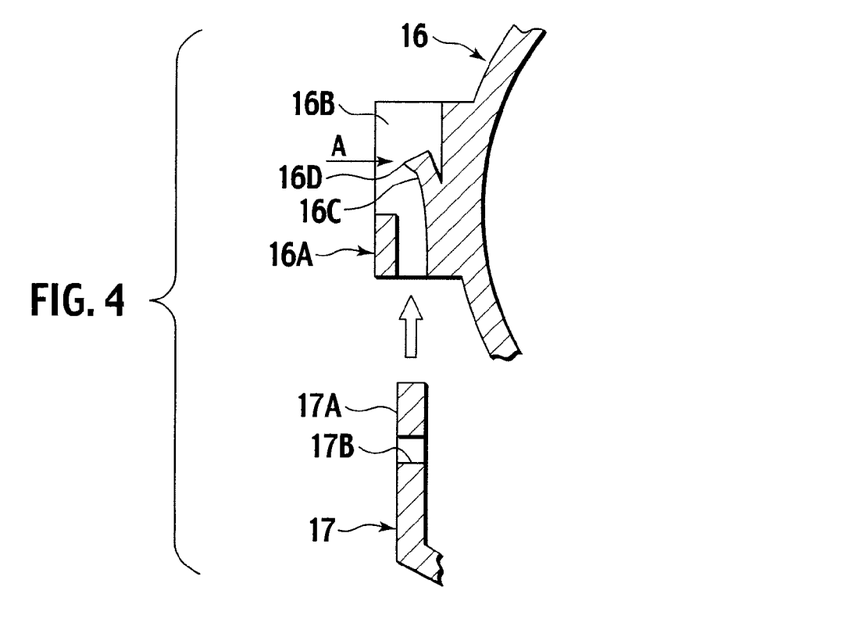
FIG. 4 is a cross-sectional view showing a state where a bracket is being connected to a connecting portion of a fixing member.

FIG. 4 is a cross-sectional view showing a state where the bracket 17 is being connected to the connecting portion 16A of the fixing member 16. The connecting portion 16A of the fixing member 16 is projected from the side of the fixing member 16 and has a block shape (see FIG. 3), and a recessed portion (a first fitting portion) 16B is formed in the center thereof. Inside the recessed portion 16B, there is a nail portion 16C, and a projection (a second fitting portion) 16D is formed at the end of the nail portion 16C and protrudes outward. The nail portion 16C is formed integrally in the body of the fixing member 16. When the projection 16D is pushed in the direction of arrow A, the nail portion 16C is biased to return to the original position (in the opposite direction to the arrow A).

Further, as shown in FIG. 3, the bracket 17 includes a projected portion (a first fitted portion) 17A which can be fitted to the recessed portion 16B of the fixing member 16. In this projected portion 17A, an engaging hole (a second fitted portion) 17B is formed.

Figure 5:
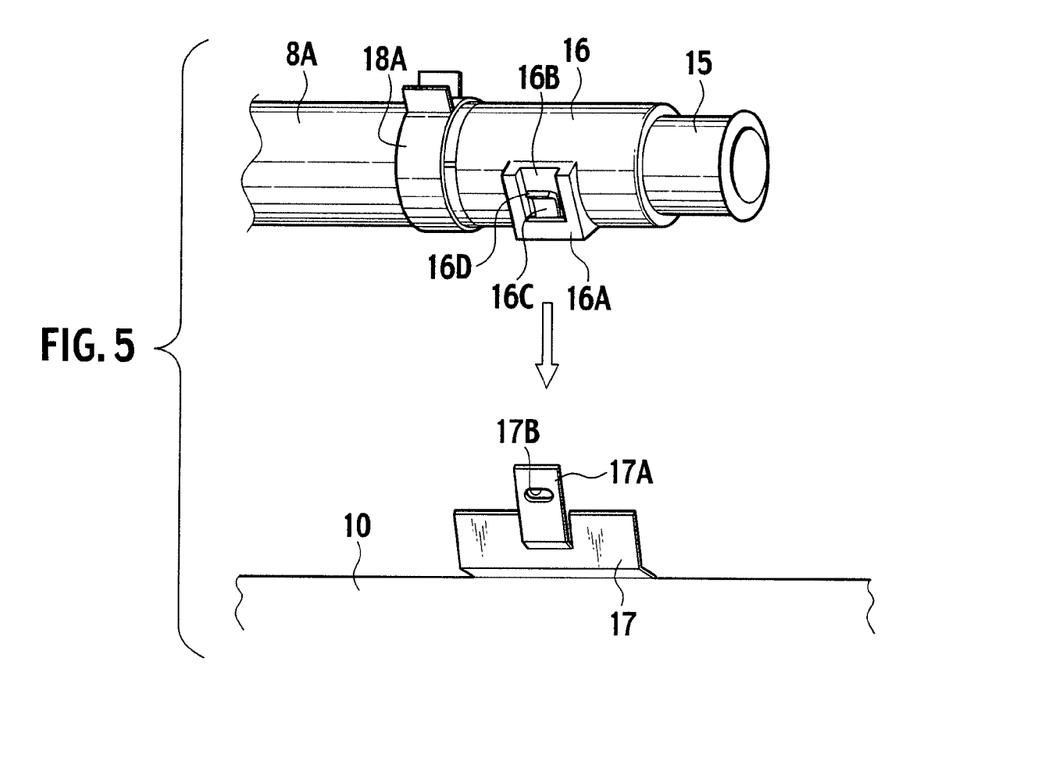
FIG. 5 is a view showing a state where the fixing member to which a lower radiator hose on the radiator side is attached is being connected to the bracket.

In the above structure, when fixing the intermediate pipe 15 to the suspension member 10, the fixing member 16 is first attached to the intermediate pipe 15, and at the same time, one end of the intermediate pipe 15 is inserted to the lower radiator hose 8A on the radiator side, and then the outer circumference surface of the end portion of the lower radiator hose 8A is fixed by the alpha clamp 18A, as illustrated in FIG. 5. As a result, the intermediate pipe 15 is attached to the end portion of the lower radiator hose 8A.

Meanwhile, the bracket 17 is attached to the suspension member 10 so that the projected portion 17A faces upward. Thereafter, the recessed portion 16B of the fixing member 16 is positioned such that it matches the position of the projected portion 17A of the bracket 17, the intermediate pipe 15 is pushed down together with the fixing member 16, and the projected portion 17A of the bracket 17 is inserted into the recessed portion 16B.

Figure 6:
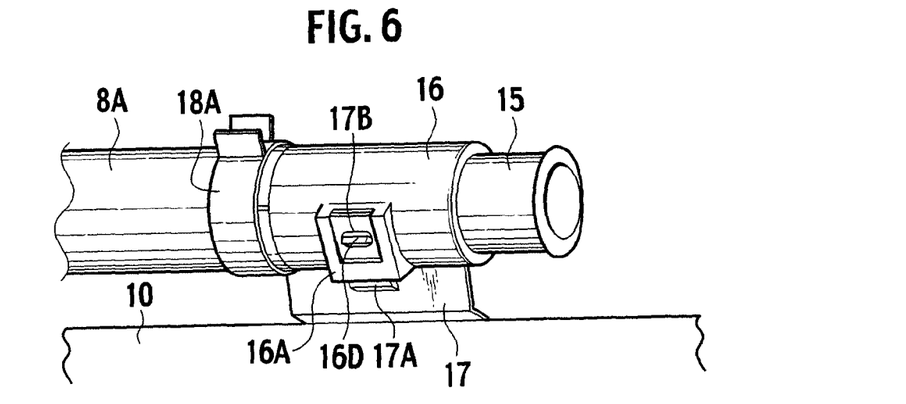
FIG. 6 is a view showing a state where the fixing member is attached to the bracket.

When the fixing member 16 is pushed down to a predetermined position, the projection 16D of the nail portion 16C that is provided with the fixing member 16 is engaged with the engaging hole 17B of the projected portion 17A as shown in FIG. 6. The nail portion 16C has elasticity which makes the nail portion 16C biased to return to the original position when pushed in the direction of the arrow A (see FIG. 4). Therefore, when the projection 16D is engaged with the engaging hole 17B, the engagement state is firmly maintained. As a result, the intermediate pipe 15 can be firmly fixed to the suspension member 10.

Figure 7:
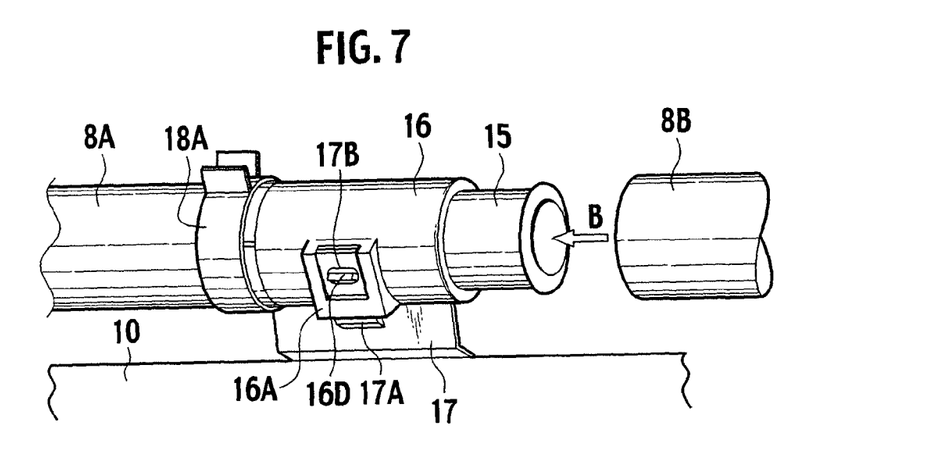
FIG. 7 is a view showing a state where a lower radiator hose on the engine side is being attached to the intermediate pipe in a state of FIG. 6.
Figure 8:
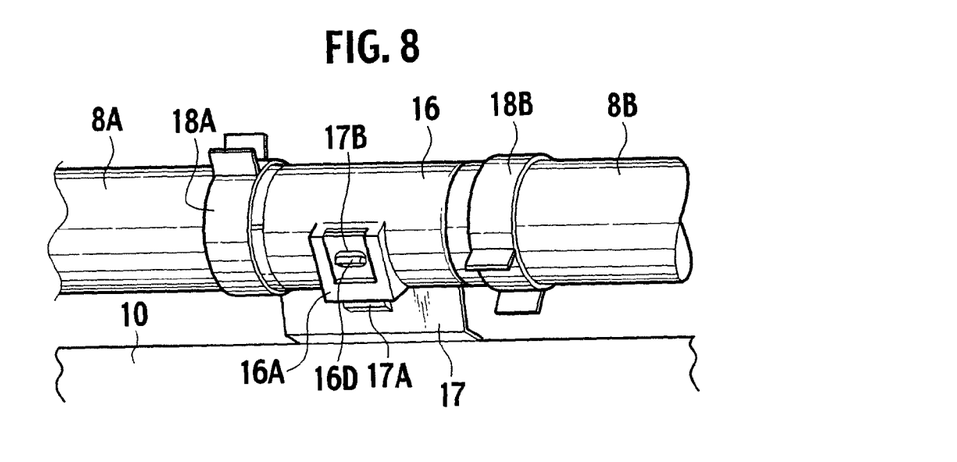
FIG. 8 is a view showing a state where the lower radiator hose on the engine side is attached.

Next, an end portion of the lower radiator hose on the engine side 8B is inserted to the other end of the intermediate pipe 15 in the arrow B direction as shown in FIG. 7. Thereafter, as shown in FIG. 8, the outer circumference surface of the end portion of the lower radiator hose 8B is fixed to by the alpha clamp 18B. As a result, the end portion of the lower radiator hose 8B is attached to the intermediate pipe 15.

In the above-described manner, the intermediate portion of the lower radiator hose 8 can be fixed to the suspension member 10.

Next, a function of the embodiment is described.

The suspension member 10 supports a suspension (not shown), and also supports the engine 2 via the vibration damping member 4B. Further, the suspension member 10 is supported by the vehicle body 1 via the vibration damping member 9, in other words, the suspension member 10 is attached to the vehicle body 1 while being damped by the vibration damping member 9. When the lower radiator hose 8 is fixed to the above type of suspension member 10, even if the lower radiator hose 8 vibrates due to vibration or the like of the engine, and the vibration travels to the suspension member 10, causing vibration of the suspension member 10, the vibration is absorbed by the vibration damping member 9, and thus does not travel to the vehicle body 1.

This means that, by using the suspension member 10 in which vibration is already damped, it becomes possible to prevent vibration or the like of the engine 2 from traveling to the vehicle body 1 via the lower radiator hose 8, without providing an additional part.

Moreover, the lower radiator hose 8 is divided into the lower radiator hose 8A extended from the radiator 3 which is attached to the vehicle body 1 and separated from the engine 2, and the lower radiator hose 8B extended from the engine. Then the divided two lower radiator hoses 8A and 8B are connected to each other via the intermediate pipe 15 which is fixed to the suspension member 10. Therefore, one part serves as a connecting part which connects the lower radiator hoses 8A and 8B, and as well as a fixing part which fixes the lower radiator hose 8 to the suspension member 10, and thus no additional part is necessary.

Moreover, the recessed portion 16B of the fixing member 16 and the projected portion 17A of the bracket 17 are formed to be fitted to each other. Therefore, by simply inserting the projected portion 17A to the recessed portion 16B, the position of the recessed portion 16B is decided in all directions except for the insertion direction. In other words, the recessed portion 16B is prevented from moving in all directions relative to the projected portion 17A except for the insertion direction. Furthermore, since the nail portion 16C and the engaging hole 17B are engaged with each other, the position of the recessed portion 16B is decided in the insertion direction. In other words, the recessed portion 16B is prevented from moving in the insertion direction relative to the projected portion 17A. Since the fixing member 16 and the bracket 17 are fixed to each other in the above-described manner, the operation for connection is easily performed.

Further, since the lower radiator hose 8 is arranged in the vicinity of the suspension member 10, the length of the fixing member 16 or a bracket 17 can be reduced, thus reducing manufacturing cost. Furthermore, since the suspension member 10 is positioned under the vehicle body, the lower radiator hose 8 can be attached to the suspension member 10 from the lower side of an engine room. Therefore, the operation for attaching the lower radiator hose 8 can be carried out easily.

Figure 9:
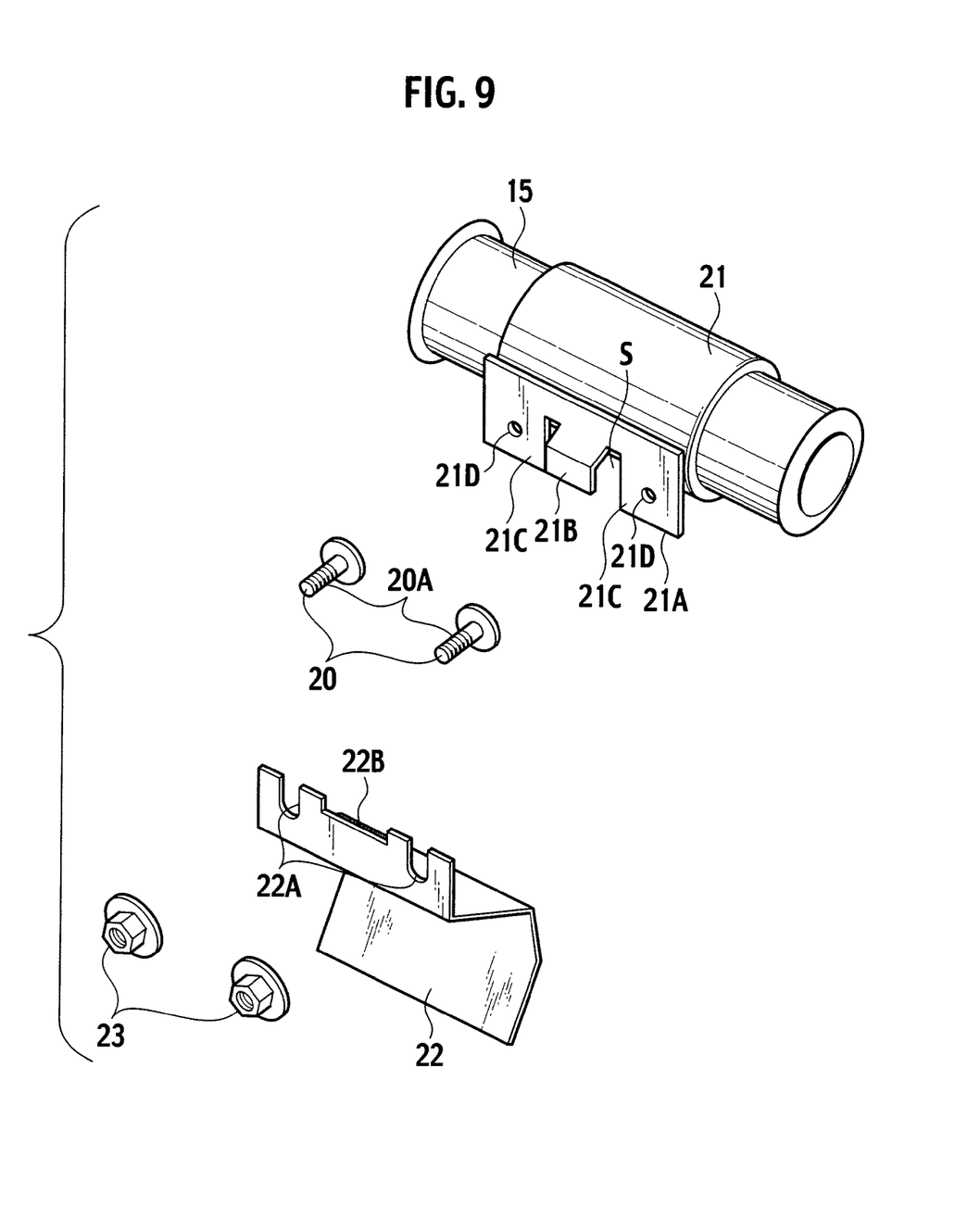
FIG. 9 is a view showing another example of the fixing mechanism.

FIG. 9 shows another example of the fixing mechanism F. The lower radiator hose 8 in FIG. 2 represents a case where this example is applied.

The fixing mechanism F shown in FIG. 9 includes a cylindrical fixing member 21, which covers the outer circumference surface of an intermediate pipe 15 and has a connecting portion 21A on the outer circumference surface thereof, and a bracket 22 which is attached to a suspension member 10 and can be connected to the connecting portion 21A.

In the center of the connecting portion 21A of the fixing member 21, a tongue 21B, slanted to the side, is formed. Further, a space (a first fitting portion) S is formed between both side portions 21C that are not slanted and the tongue 21B. In the both side portions 21C, bolt holes 21D are provided where stud bolts 20 are penetrated. The stud bolts 20 are welded to both side portions 21C such that the under-head portions (second fitting portions) 20A of the stud bolts 20 protrude from the bolt holes 21D.

Further, the bracket 22 is provided with a fitted portion (a first fitted portion) 22B which is freely fitted to the space S. Moreover, on both sides of the fitted portion 22B, U-shaped cut-out openings (second fitted portions) 22A are provided, where the stud bolts 20 are fitted.

When fixing the intermediate pipe 15 to the suspension member 10, the position of the intermediate pipe 15 is decided in an axis direction of the stud bolts 20 by fitting the fitted portion 22B of the bracket 22 to the space S. Further, by fitting the cut-out openings 22A of the bracket 22 to the under-head portions 20A of the stud bolts 20, the position of the intermediate pipe 15 is decided in a radial direction of the stud bolts 20. Thereafter, the connecting portion 21A and the bracket 22 are connected to each other by screwing nuts 23, which are to be screwed to the stud bolts 20 together, onto the under-head portions 20A from the side of the bracket 22.

According to the embodiment, since the fixing member 21 and the bracket 22 are fixed to each other by screwing the nuts 23 onto the stud bolts 20, the lower radiator hose 8 can be fixed more firmly to the suspension member 10.

Although the embodiments of the present invention are described above with reference to the drawings, these embodiments are just examples of the present invention, and thus the present invention is not limited to the structures described in the above embodiments. For example, in these embodiments, a driving source is an engine, a functional part is a radiator, and piping is a radiator hose which connects the engine and the radiator. However, the present invention is not limited to them, and a driving source may be a motor, a functional part may be an electrically-driven part which utilizes electricity from the motor, and piping may be a tube-like covered harness which connects the motor and the electrically-driven part.

Moreover, in the embodiment illustrated in FIG. 3, the fixing member 16 which is connected to the intermediate pipe 15 is provided with a connecting portion 16A that includes the recessed portion 16B, the nail portion 16C, and the projection 16D, and the bracket 17 to be connected to the suspension member 10 is provided with the projected portion 17A that includes the engaging hole 17B. However, the same function is obtained even when the projected portion 17A is provided with the fixing member 16, and the connecting portion 16A is provided with the bracket 17.

Further, in the embodiment illustrated in FIG. 9, the stud bolts 20 and the connecting portion 21A that includes the tongue 21B, the space S and the bolt holes 21D are provided with the fixing member 21, and the fitted portion 22B and cut-out openings 22A are provided with the bracket 22. However, the fitted portion 22B and the cut-out openings 22A may be provided in the fixing member 21, and the stud bolts 20 and the connecting portion 21A may be provided with the bracket 22.

Furthermore, in the embodiment illustrated in FIG. 9, the stud bolts 20 are fixed to the connecting portion 21A, and the cut-out openings 22A are provided with the bracket 22. However, the stud bolts 20 may be fixed to the bracket 22, and the cut-out openings 22A may be provided in the connecting portion 21A.

The entire content of a Japanese Patent Application No. P2006-113110 with a filing date of Apr. 17, 2006 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A piping fixing structure, comprising:
   a vehicle body;
   a suspension member which is elastically supported by the vehicle body via a first vibration damping member, and supports a suspension; and
   a fixing mechanism which fixes a radiator hose to the suspension member,
   wherein the radiator hose connects an engine and a radiator,
   wherein the engine is elastically supported by both the vehicle body via a second vibration damping member and the suspension member via a third vibration damping member, and
   wherein the radiator is attached to the vehicle body separately from the engine, and both upper and lower portions of the radiator are elastically supported by the vehicle body via fourth vibration damping members.

2. The piping fixing structure according to claim 1, wherein the fixing mechanism comprises a connecting member,
   wherein the radiator hose is divided into a first hose that is connected to the engine and a second hose that is connected to the radiator, the first hose and the second hose being connected to each other by the connecting member, and
   wherein the connecting member is fixed to the suspension member.

3. The piping fixing structure according to claim 2, wherein the fixing mechanism further comprises:
   a first fitting portion provided with either one of the connecting member or the suspension member;
   a first fitted portion provided with the other one of the connecting member and the suspension member, the other one of the connecting member and the suspension member being different from the either one of the connecting member or the suspension member with which the first fitting portion is provided, the first fitted portion being inserted into the first fitting portion;
   a second fitting portion provided with either one of the connecting member or the suspension member; and
   a second fitted portion provided with the other one of the connecting member and the suspension member, the other one of the connecting member and the suspension member being different from the either one of the connecting member or the suspension member with which the second fitting portion is provided, the second fitted portion being inserted into the second fitting portion, and
   wherein the connecting member is prevented from moving in all directions except for an inserting direction of the first fitted portion relative to the suspension member by inserting the first fitted portion into the first fitting portion, and the connecting member is prevented from moving in the inserting direction of the first fitted portion relative to the suspension member by inserting the second fitted portion to the second fitting portion.

4. The piping fixing structure according to claim 2, wherein the radiator hose is arranged in a vicinity of the suspension member.

5. The piping fixing structure according to claim 2, wherein the fixing mechanism further comprises:
- a first fitting portion provided with either one of the connecting member or the suspension member; and
- a first fitted portion provided with the other one of the connecting member and the suspension member, the other one of the connecting member and the suspension member being different from the either one of the connecting member or the suspension member with which the first fitting portion is provided, the first fitted portion being inserted into the first fitting portion.

* * * * *